United States Patent
Littlejohn et al.

(10) Patent No.: US 10,673,934 B2
(45) Date of Patent: Jun. 2, 2020

(54) METHOD FOR DENOMINATING MOVE GROUPS OF APPLICATIONS

(71) Applicant: RISC Networks, LLC, Asheville, NC (US)

(72) Inventors: Jeremy Lynn Littlejohn, Fairview, NC (US); Gregory Evan Watts, Nottingham, NH (US)

(73) Assignee: RISC Networks, LLC, Asheville, NC (US)

(*) Notice: Subject to any disclaimer, the term of this patent is extended or adjusted under 35 U.S.C. 154(b) by 0 days.

(21) Appl. No.: 16/167,135

(22) Filed: Oct. 22, 2018

(65) Prior Publication Data

US 2019/0058759 A1    Feb. 21, 2019

Related U.S. Application Data

(63) Continuation of application No. 15/882,708, filed on Jan. 29, 2018, now abandoned, which is a continuation of application No. 14/846,791, filed on Sep. 6, 2015, now abandoned.

(51) Int. Cl.
*H04L 29/08* (2006.01)

(52) U.S. Cl.
CPC .................... *H04L 67/10* (2013.01)

(58) Field of Classification Search
CPC ................ H04L 67/10; H04L 43/04
See application file for complete search history.

(56) References Cited

U.S. PATENT DOCUMENTS

| | | | |
|---|---|---|---|
| 7,925,874 B1 | 4/2011 | Zaitsev | |
| 9,231,833 B1 | 1/2016 | Bandopadhyay | |
| 10,193,824 B2 | 1/2019 | Littlejohn et al. | |
| 2002/0095454 A1 | 7/2002 | Reed | |
| 2007/0061495 A1* | 3/2007 | Cummins | G06F 9/445 710/62 |
| 2010/0067400 A1 | 3/2010 | Dolganow | |
| 2012/0297089 A1 | 11/2012 | Carothers | |
| 2013/0117847 A1 | 5/2013 | Friedman | |
| 2014/0068747 A1 | 3/2014 | Burchfield | |
| 2014/0108483 A1* | 4/2014 | Tarta | G06F 9/5072 709/201 |
| 2014/0172782 A1* | 6/2014 | Schuenzel | G06Q 50/22 707/609 |
| 2015/0304880 A1* | 10/2015 | Kotecha | H04W 28/0215 455/437 |
| 2016/0028580 A1 | 1/2016 | Radivojevic | |
| 2017/0126564 A1 | 5/2017 | Mayya | |

\* cited by examiner

*Primary Examiner* — Michael A Keller
(74) *Attorney, Agent, or Firm* — Knobbe, Martens, Olson & Bear, LLP

(57) ABSTRACT

A method of staging a move group of applications of a network is provided and includes the step of developing a reference base of applications via monitoring traffic flow between devices of the network on which applications are executed or accessing information about such applications. The method further includes the step of classifying each such selected application as a member of one of the classification sub-sets with regard to applications of the reference application base. Additionally, the method includes the step of accessing information about the classification sub-sets of those respective applications executed on each of a target group of devices to thereby form an application classification glossary associated with the device.

14 Claims, 4 Drawing Sheets

METHOD FOR DENOMINATING MOVE GROUPS OF APPLICATIONS

RELATED APPLICATIONS

This application is a continuation application of U.S. application Ser. No. 15/882,708, filed Jan. 29, 2018, which is a continuation application of U.S. application Ser. No. 14/846,791, filed Sep. 6, 2015.

BACKGROUND OF THE INVENTION

US Published Patent Application No. 2011/0246376 to Devakondra et al points out that network data processing systems are used for a variety of different purposes and come in a number of different forms. Several types of network data processing systems are commonly used by companies and other organizations and may include, for example, local area networks, wide area networks, virtual private networks, and other suitable types of networks.

In addition to such networks that may be maintained by the network operator itself, cloud services are available and the users of this type of network data processing systems neither own nor manage the physical infrastructure. In this manner, users may avoid capital expenditures, support costs, maintenance costs, labor costs, and other costs associated with more traditional types of networks. With cloud-based network environments, users consume resources as a service and typically pay based on the use of those resources. By turning to cloud-based computing resources, companies and organizations can avoid capital expenditures, such as costs for hardware, software, information technology services, and other associated costs.

Clouds may include, for example, a public cloud, a private cloud, and a hybrid cloud. A public cloud is a network environment in which users access computing resources over a network, such as the Internet. A private cloud is an internal cloud in which resources are accessed on private networks, such as an intranet. A private cloud also may provide additional separation from other users. A private cloud may include firewalls and other devices to provide for increased security and separation.

Organizations that employ more traditional types of network data processing systems may contemplate whether to change over from their more traditional network environment to a cloud network environment. In view of the fact that the particular cloud services offered by each cloud service provider or vendor will have different features, benefits, service operating requirements, and costs, it would be advantageous for a network operator to have access to tools that can help guide a decision to migrate computing tasks to a cloud. Moreover, it would be advantageous if such tools for a guiding a network operator could equip the network operator to have an accurate picture of the computing resources in its own network that will or can be replaced by the cloud computing resources. Furthermore, network operators can make better informed decisions about purchasing cloud services if they can get pricing information about potential cloud service providers and, especially, pricing information about the scope of computing resources that tasks could be taken over in a cloud service arrangement.

Computer networks consist of a number of computers in communication with each other. Often, networks are complicated or are built on an as-needed basis. For example, in a school setting, computers may generally be added when they can be afforded and joined into the network one by one. With larger organizations the complexity of the network and the communication between the devices within them can be even greater. Further, since the popularity of the internet, networks are no longer restricted to a single building or organization and instead the computers in the network can be spaced all over the world and across organizations. Since the construction of different parts of the network was by different people in many instances no one person knows the overall infrastructure of the network and how the elements are connected together. Even without the addition of new computers it is quite common for the implementation of real systems to be changed many times during its building operation (server swapped maintenance repair, et).

The arrangement of devices in the network and how they communicate with each other is sometimes referred to as network topology. The term "physical topology" can be used to refer to the arrangement of hardware and cabling but generally it is at least as important to know the manner of communications and the paths of the signals between the computers (sometimes referred to as a logical or signal topology). There are many applications and circumstances for which it is beneficial to understand the network and how computers are connected to each other, i.e., to acquire a mapping of the topology.

It is known to attempt to map and then monitor the topology of networks using various systems and methods and one known method is to install a software agent on each computer in the network. Each agent then searches the file system of the computer it is hosted on to determine what software is running on it. Based on what software is running it attempts to deduce whether it is a client (because it has found software to be used by the end user), a server (by having hosting software), or a firewall, etc. Since applications and software that may be loaded on the computer come in many different forms which change frequently, having an agent that can successfully identify all relevant software is difficult, and such agents must constantly be updated to accommodate new software.

Another approach is to attempt to establish data paths by using software such as 'trace route'. Trace route is a computer networking tool that is used to determine the route taken by packets across an IP network. Trace route and similar programs work by sending successive batch of packets over the network and calculating the route from this. Trace route relies on ICMP (internet Control Message Protocol). A number of problems are associated with this approach, such as the problem that it relies on new data being sent through the system, thereby changing the traffic flowing. This in itself may not be a problem where there is sufficient bandwidth, but due to security concerns it is relatively common for firewalls to identify such foreign packets and to stop them from proceeding any further into the network.

SUMMARY OF THE INVENTION

One object of the present invention is to provide a method of staging a move group of applications of a network. The method includes the step of developing a reference base of applications via monitoring traffic flow between devices of the network on which applications are executed or accessing information about such applications. The method further includes the step of classifying each such selected application as a member of one of the classification sub-sets with regard to applications of the reference application base. Additionally, the method includes the step of accessing information about the classification sub-sets of those respective applications executed on each of a target group of devices to thereby form an application classification glossary associated with the device, wherein, within the application glossary associated with each device, each application belonging to a respective classification sub-set is grouped together with all applications that both belong to that same classification sub-set and are hosted on the device. The method additionally further includes the step of denominating a move group of applications by: (a) deeming that all respective applications sharing a common membership in a respective classification sub-set are to be considered as a move group or (b) determining that certain applications commonly classed in a respective classification sub-set are also additionally members of a class of applications sharing a common property and deeming that such certain applications are to be considered as a move group.

Another object of the present invention is to provide computer readable medium containing computer executable instructions which when executed on one or more computers of a network causes the respective computer or computers to perform the method of staging a move group of applications of a network.

A further object of the present invention is to provide a computer based apparatus operable to provide an evaluation of certain characteristics of a network, the apparatus comprising a processor, a memory, and an input element operable to be in communication with a plurality of computers of a network that is to be evaluated and the computer based apparatus being operable to perform the method of staging a move group of applications of a network.

Other aspects, embodiments and advantages of the present invention will become apparent from the following detailed description which, taken in conjunction with the accompanying drawings, illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which.

DETAILED DESCRIPTION OF AN EMBODIMENT OF THE INVENTION

Figure 1:
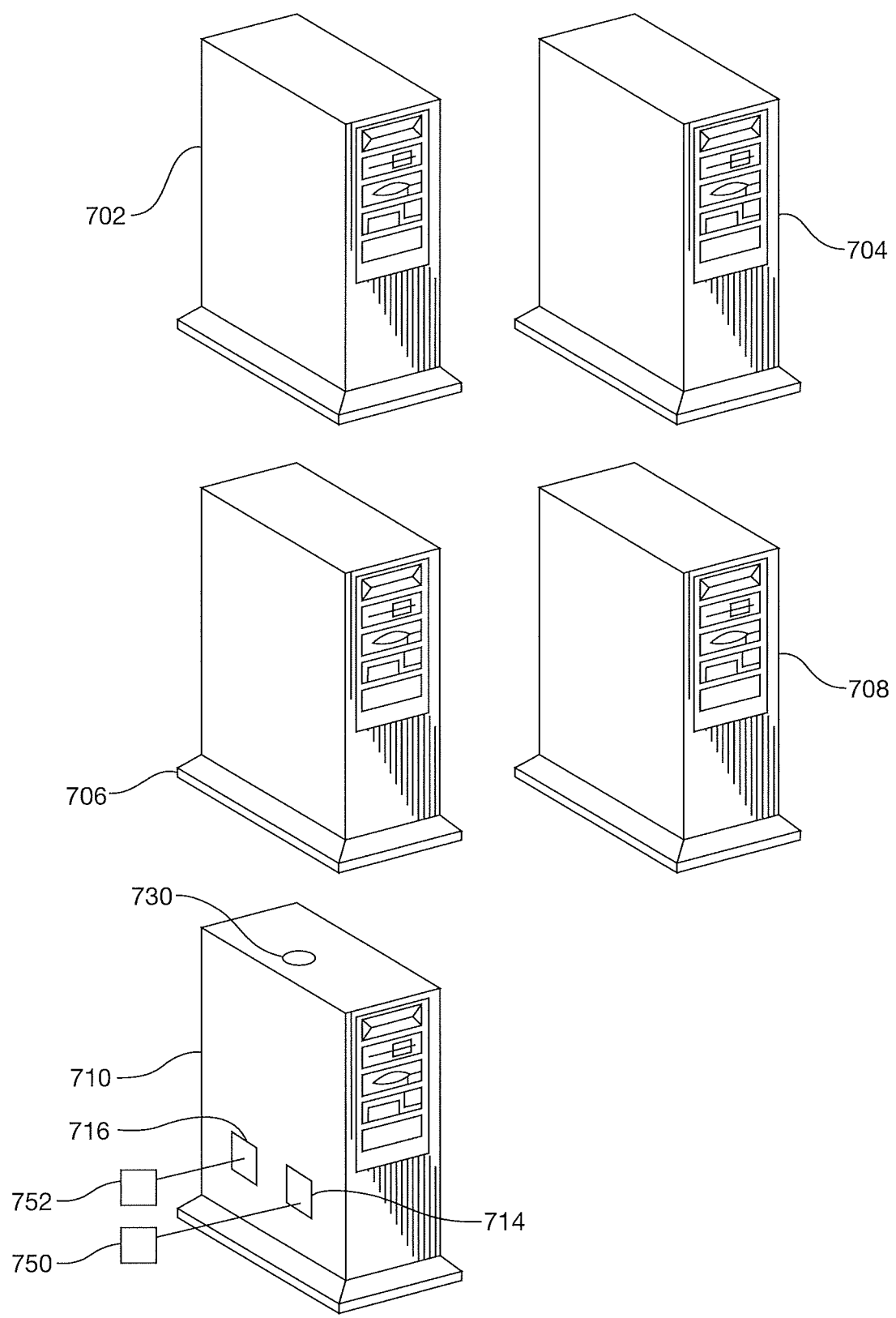
FIG. 1 is a schematic view of a portion of a network.

Reference is now had to FIG. 1, which is a schematic view of a portion of a network 700. The network 700 comprises a plurality of devices, some in the form of computers, and the respective computers that are schematically shown in FIG. 1 form a part of the network 700 and are operatively connected to other computers and devices of the network (not shown). In this example five devices 702, 704, 706, 708 and 710 are illustrated. Each device may be a web server, a terminal connected solely to a web server, or other known device typically comprised in a network. Solely for the sake of illustration, the five devices 702, 704, 706, 708 and 710 are similarly equipped and, in this regard, as is shown with respect to the device 710, each of the devices comprises a processor 712, a par of network interfaces 714, 716, and a software program 720 executable to implement the move group identifier method of the present invention with respect to the network 700.

The pair of network interfaces 714, 716 are connected to an Ethernet connection 750 and a Wi-Fi connection 752, respectively. The Ethernet and Wi-Fi connections therefore enable the device 710 shown to connect to one or more of the other devices 702, 704, 706, and 705 as well as other devices in the network. A remote processor which may be hosted on another computer of the network 700, for example, or which may be a VM processor, may be operatively connected to one or more of the devices 702, 704, 706, 708 and 710. This remote processor (not shown) may partially or fully execute the software program 720 hosted on the device 710.

The software program 720 includes four modules 722, 724, 726, and 728 and a database 730. As seen in more detail in FIG. 2, which is an enlarged schematic view of the software program 720, the module 722 provides a discovery configuration module capability, the module 724 provides a discovery conductor module capability, the module 726 provides a communication interface capability, and the module 728 provides a process management capability.

The software program 720 is executed to configure the five devices 702, 704, 706, 708 and 710 to enable discovery of network traffic transmitted or received via their connected interfaces 714, 716. The discovery of network traffic is preferably accomplished via a collection of workload data, applications, services, performances as an initial step. This collection effort can make reference to data hosted on a memory within a device, wherein such memory can mean random access memory or any form of data storage device such as a hard drive or flash memory. The data can be comprised in a database that is an in-memory or file supported relational database system.

Figure 2:
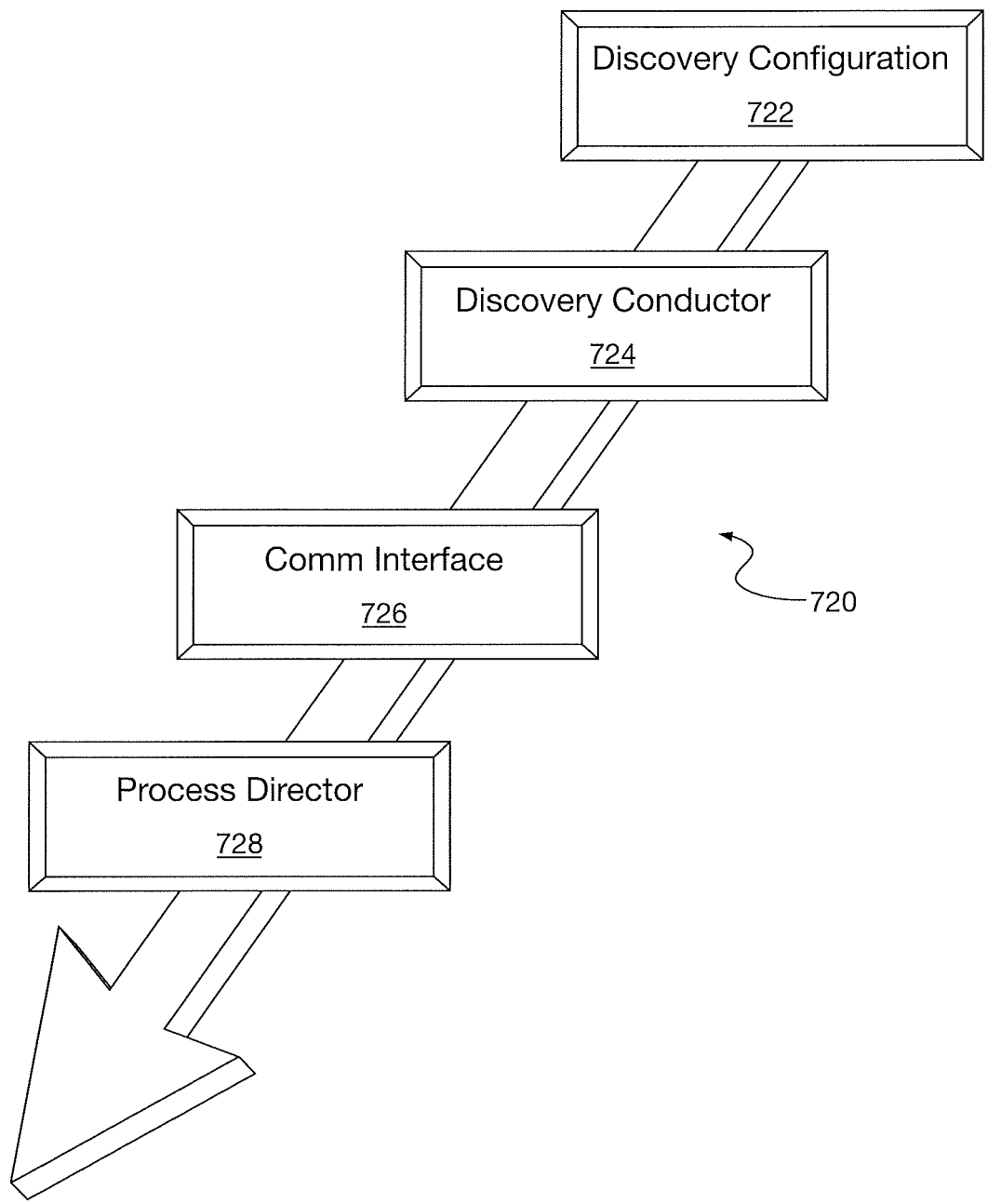
FIG. 2 is an enlarged schematic view of a software program executable to implement the method of the present invention.
Figure 3:
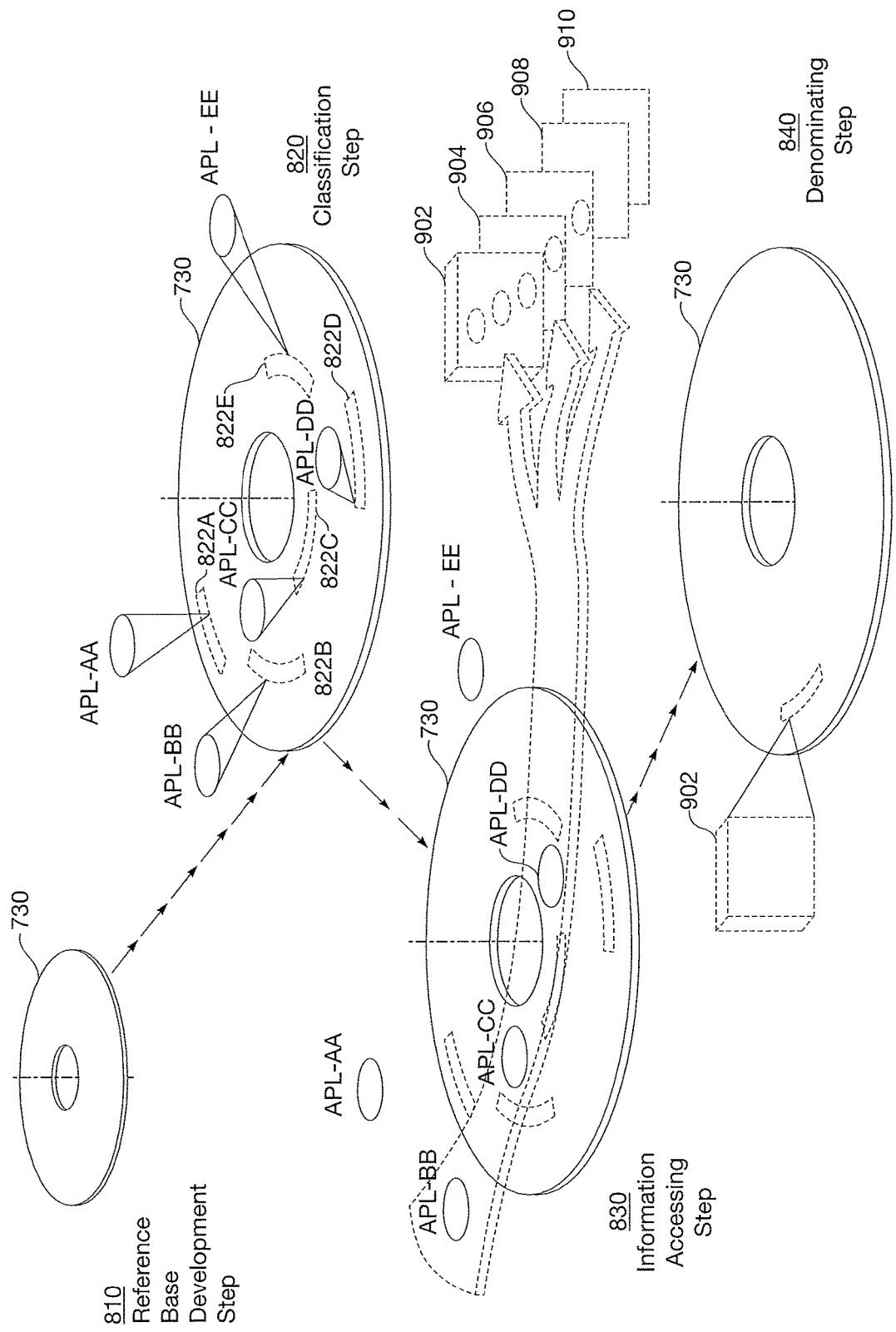
FIG. 3 is a schematic view of an exemplary implementation of the move group identifier method of the present invention.

The data can be already organized in a form, for example, such as a traffic flow table or a network interface table. Such a traffic flow table can include IP addresses and port specific network traffic information. The network interface table may include vendor descriptions, interface names, MAC (Media Access Control or Ethernet hardware addresses), and media types. The communication interface module 726 configures the device 710 to connect to the remote processor to upload reports. The interface of this communication interface module 726 can be a web service or be provided by e-mailing a file report to the remote processor which will typically be the main server. Reference is now had to FIG. 2 and to FIG. 3, which is a schematic view of an exemplary implementation of the move group identifier method of the present invention. As seen in FIG. 3, the move group identifier method of the present invention, hereinafter referred to as the move group identifier method 810, comprises several steps that, when performed with respect to a network, provide a user with a move group of applications hosted on the network. The term "move group of applications" is directed to the concept of providing a fully automatic approach, or at least with an approach with some automated aspects, for identifying a suggested or desired grouping of applications currently hosted on a network to a user, whereupon the user can more easily consider or plan a migration of at least some of the network's tasks to a different network such as, for example, a migration of network tasks to an external network in the form of a private or public cloud network.

The exemplary implementation of the move group identifier method 810 shown in FIG. 3 is conducted on the devices 702-710 of the portion of the network 700 shown in FIG. 1 and the implementation of the move group identifier method 810 is managed by the software program 720. The move group identifier method 810 includes several steps that are automatically performed once an initiation command is provided by a user and the method ultimately yields a suggested or desired grouping of applications currently hosted on the network 700 which can be displayed, for example, in a on-screen report to the user. Moreover, the move group identifier method 810 includes the flexibility that a user can command a re-execution of the method with a change in the filters or a change in a process variable, so that a different suggested or desired grouping of applications currently hosted on the network 700 will be displayed to the user. It can be understood that this manner of iteratively changing the inputs that are processed via the move group identifier method 810 beneficially provides a user with a range of different perspectives in considering network migration scenarios. For example, a user can customize implementation of the move group identifier method 810 to provide information about a group of applications hosted at a common location or to provide information about a group of applications that handle a common task (i.e., antivirus applications), whereupon the user can strategically plan a migration to avoid excess redundancies of such applications.

The move group identifier method 810 includes a reference base development step 810 for developing a reference base of applications. This reference base of applications is developed via monitoring of the traffic flow between the devices of the network on which applications are executed or accessing information about such applications. Accordingly, the discovery configuration module 722 of the software program 720 configures the discovery conductor module 724 to monitor traffic flow between the devices 702-710 message (i.e., message traffic transmitted or received via applications hosted on these devices) as well as traffic flow between these devices and other devices of the network 700. Additionally or alternatively, the discovery configuration module 722 of the software program 720 configures the discovery conductor module 724 to access information about these applications via reference, for example, to network statistics stored on a memory capacity that is part of the network 700. This reference base development step 810 results in the creation of a reference base of applications that is stored on the memory 730 of the network 700. The applications in the reference base of applications are representatively shown as applications APL-AA, APL-BB, APL-CC, APL-DD, and APL-EE.

The move group identifier method 810 also includes a classification step 820 that is performed by the process director module 728 of the software program 720. The process director module 728 accesses the memory 730 and, with regard to applications of the reference application base, the process director module 728 classifies each such selected application as a member of one of a collection of classification sub-sets. A classification sub-set is to be understood as set of applications sharing a common property such as, for example, the common property that a of the applications are Windows-based applications or Linux-based applications. The process director module 728 is configured to automatically allocate each application of the reference application base to a respective classification sub-set based upon pre-set criteria such as, for example, a pre-set criteria to commonly assign to a single classification sub-set all those applications having a Windows-based operating system (as noted during the reference base development step 810). Additionally or alternatively, the allocations made by the process director module 728 can be supplemented or adjusted via the intervention of a classification oversight feature. For example, the process director module 728 can be supplemented or adjusted via the intervention of a classification oversight feature wherein the user or an external entity that is implementing the move group identifier method 810 can adjust or override the allocation choices suggested by the process director module 728.

The classification sub-sets are schematically shown in FIG. 3 as classification sub-sets 822A-E. Thus, it can be seen that the applications in the reference base of applications, representatively shown as applications APL-AA, APL-BB, APL-CC, APL-DD, and APL-EE, are each a member of a respective one of the classification sub-sets 822A-E.

The move group identifier method 810 further includes an information accessing step 830 that is performed by the process director module 728 of the software program 720. The process director module 728 accesses the memory 730 and, with regard to each individual device of a target group of devices of the network—namely, the five devices 702, 704, 706, 708 and 710 of the network 700, the process director module 728 accesses information about the classification sub-sets of those respective applications executed on the respective device to thereby form an application glossary associated with that respective device. Accordingly, the process director module 728 of the software program 720 accesses information about the devices 702-710 and forms the corresponding set of application glossaries 902-910, schematically shown as residing in the storage 730. Within the application glossary associated with each device, each application belonging to a respective classification sub-set is grouped together with all applications that both belong to that same classification sub-set and are hosted on the device. Thus, for example, the application classification glossary 902, which is associated with the device 702, may list several applications all belonging to the respective classification sub-set comprised of anti-virus applications and may additionally list an application belonging to the respective classification sub-set comprised of Active Directory applications.

The move group identifier method 810 additionally includes a denominating step 840 that is performed by the process director module 728 of the software program 720. The process director module 728 accesses the memory 730 and denominates a move group of applications. The denominated move group of applications is a suggested or desired grouping of applications currently hosted on the network and this information is communicated to the user, whereupon the user can more easily consider or plan a migration of at least some of the network's tasks to a different network such as, for example, a migration of network tasks to an external network in the form of a private or public cloud network.

In accordance with the denominating step 840, the process director module 728 denominates a move group of applications by: (a) deeming that all respective applications sharing a common membership in a respective classification sub-set are to be considered as a move group or (b) determining that certain applications commonly classed in a respective classification sub-set are also additionally members of a class of applications sharing a common property and deeming that such certain applications are to be considered as a move group. Thus, for example, if the process director module 728 is directed to denominate a move group of applications under option (a) of the denominating step 840 by deeming that all respective applications sharing a common membership in a respective classification sub-set are to be considered as a move group, the process director module 728 can access the memory 730 and denominate a move group of applications that is comprised of all of the applications hosted on the five devices 702, 704, 706, 708 and 710 of the network 700—this information is namely the information listed in the application glossaries 902-910.

Additionally or alternatively, a denomination of a move group of app cations made by the process director module 728 can be supplemented or adjusted via the intervention of a classification oversight feature. For example, the process director module 728 can supplemented or adjusted via the intervention of a classification oversight feature wherein the user or an external entity that is implementing the move group identifier method 810 can adjust or override the move group choices suggested by the process director module 728.

Figure 4:
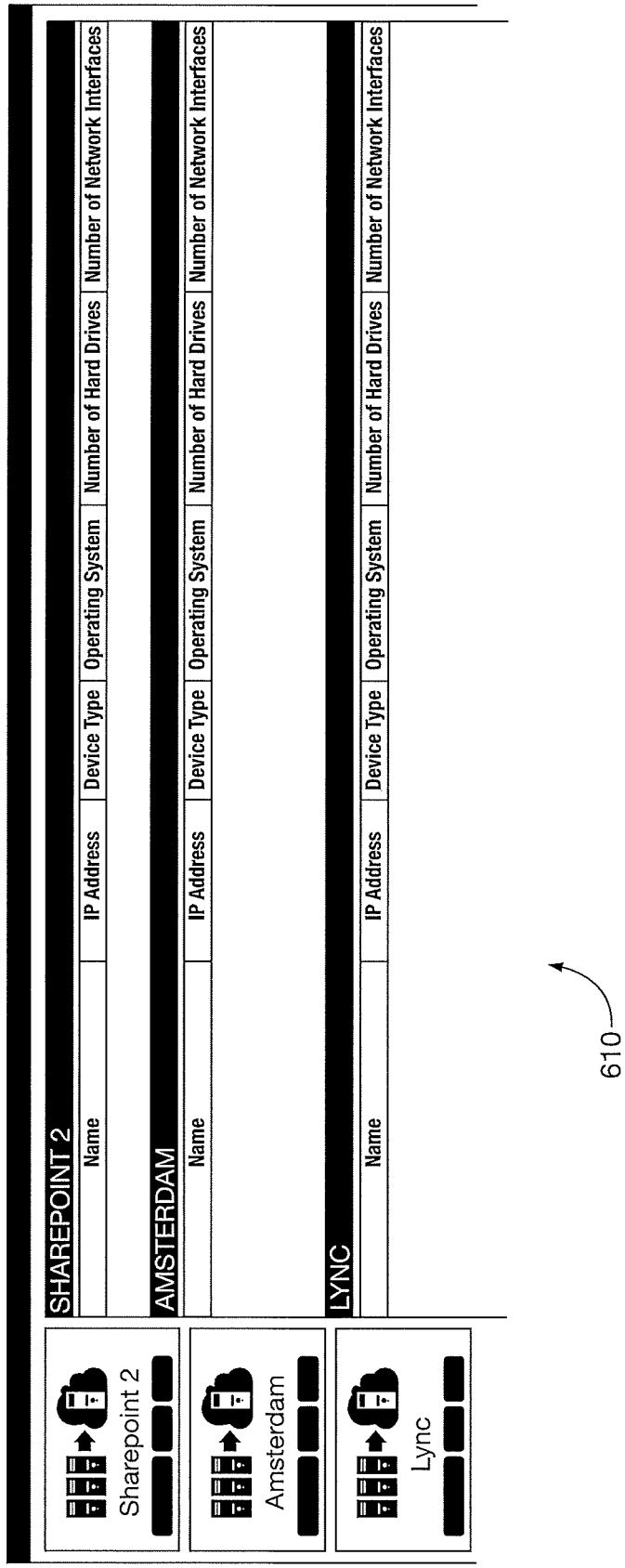
FIG. 4 is a graphical representation of an exemplary display format for displaying a list of move group choices to a user.

On the other hand, if the process director module 728 is directed to denominate a move group of applications under option (b) of the denominating step 840 by determining that certain applications commonly classed in a respective classification sub-set are also additionally members of a class of applications sharing a common property and deeming that such certain applications are to be considered as a move group, the process director module 728 can access the memory 730 and identify such applications that satisfy both criteria. Reference is had to FIG. 4, which is a graphical representation of an exemplary display format for displaying a list of move group choices to a user. A display screen image 610 shows a total of three rows sub-headed "Sharepoint2", "Amsterdam", and "Lync" and each sub-headed row comprises one or more listings of applications, with information about each application being provided under columns denominated as Name, IP Address, Device Type, Operating System, Number of Hard Drives, and Number of Network interfaces. With particular reference to the manner in which the information in the row sub-headed "Amsterdam" has been yielded as a result of execution of the denominating step 840, it can be seen that the process director module 728 has been tasked to identify all those applications that are commonly classed in the respective classification sub-set that includes all applications that are Linux-based applications (see, e.g., the information listed in the row sub-headed "Amsterdam" under the column "Operating System") and, additionally, the process director module 728 has been tasked to identify all those applications are also additionally members of a class of applications sharing a common property—namely, identify all those applications are also additionally members of the class of applications that are hosted on devices located in Amsterdam.

While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Additionally, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or DVDs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

We claim:

1. A method of staging a move group of applications of a network, comprising:
under control of a computing system comprising one or more computer processors configured to execute specific instructions,
obtaining traffic flow table data representing internet protocol addresses and ports associated with network traffic;
developing a reference base of applications based at least partly on monitoring traffic flow between devices of the network and accessing information about the applications, wherein the information comprises network statistics based at least partly on the traffic flow table data;
with regard to applications of the reference base of applications, classifying each such application as a member of one or more classification sub-sets;
with regard to each device of a target group of the devices of the network, accessing information about the one or more classification sub-sets of those respective applications executed on the device to form an application classification glossary associated with the device, wherein, within the application glossary associated with each device, each application belonging to a respective classification sub-set is grouped together with all applications that both belong to that same classification sub-set and are hosted on the device;
denominating a first move group of applications by identifying as the first move group all applications sharing a common membership in a first classification sub-set of the one or more classification sub-sets;
denominating a second move group of applications by identifying as the second move group one or more applications from a plurality of applications sharing a common membership in a second classification sub-set of the one or more classification sub-sets based at least partly on the one or more applications sharing a common property separate from common membership in the second classification sub-set, wherein the common property comprises a location;
causing display of a user interface representing at least one of the first move group of applications or the second move group of applications; and receiving, via the user interface, filter data representing a filter to be used to denominate a third move group of applications.

2. The method of claim 1, further comprising obtaining network interface table data representing interface names, hardware identifiers, and media types associated with network traffic, wherein the network statistics are based at least partly on the network interface table data.

3. The method of claim 1, further comprising receiving, via the user interface, customization data representing a customization to be applied to at least one of the first move group of applications or the second move group of applications.

4. The method of claim 1, wherein classifying each such application as a member of one or more classification sub-sets comprises classifying a first application as a member of a first classification subset based at least partly on a common characteristic of applications in the first classification sub-set, wherein the common characteristic relates to one of: an operating system, an application function, or an application security profile.

5. The method of claim 1, wherein denominating at least one of the first move group of applications or the second move group of applications comprises identifying at least one application executed by a plurality of devices of the network.

6. The method of claim 1, wherein denominating at least one of the first move group of applications or the second move group of applications comprising identifying at least one application, the execution of which is to be moved from one or more devices of the network to one or more devices of a second network external to the network.

7. A system comprising:
   computer-readable memory storing computer-executable instructions; and
   one or more processors in communication with the computer-readable memory and configured by the computer-executable instructions to at least:
      obtain traffic flow table data representing internet protocol addresses and ports associated with network traffic flow between devices of a network;
      develop a reference base of applications based at least partly on the network traffic flow between devices of the network, wherein the network traffic flow is determined based at least partly on the traffic flow table data;
      classify individual applications of the reference base of applications as members of one or more classification sub-sets;
      generate an application classification glossary for each device of a target group of devices of the network, wherein within the application classification glossary for a particular device, each application belonging to a respective classification sub-set is grouped together with all applications that both belong to that same classification sub-set and are hosted on the particular device;
      determine a first move group of applications by identifying as the first move group all applications sharing a common membership in a first classification sub-set of the one or more classification sub-sets;
      determine a second move group of applications by identifying as the second move group one or more applications from a plurality of applications sharing a common membership in a second classification sub-set of the one or more classification sub-sets based at least partly on the one or more applications sharing a common location property separate from common membership in the second classification sub-set;
      cause display of a user interface representing at least one of the first move group of applications or the second move group of applications; and
      receive, via the user interface, filter data representing a filter to be used to denominate a third move group of applications.

8. The system of claim 7, wherein the one or more processors are further configured by the computer-executable instructions to obtain network interface table data representing interface names, hardware identifiers, and media types associated with network traffic, wherein the network traffic flow is determined based at least partly on the network interface table data.

9. The system of claim 7, wherein the one or more processors are further configured by the computer-executable instructions to receive, via the user interface, customization data representing a customization to be applied to at least one of the first move group of applications or the second move group of applications.

10. The system of claim 7, wherein each application in the first classification sub-set is classified in the first classification sub-set based at least partly on a common characteristic of applications in the first classification sub-set, wherein the common characteristic relates to one of: an operating system, an application function, or an application security profile.

11. Non-transitory computer-readable storage comprising executable instructions that configure a computing system to at least:
   obtain traffic flow table data representing internet protocol addresses and ports associated with network traffic flow between devices of a network;
   develop a reference base of applications based at least partly on the network traffic flow between devices of the network, wherein the network traffic flow is determined based at least partly on the traffic flow table data;
   classify individual applications of the reference base of applications as members of one or more classification sub-sets;
   generate an application classification glossary for each device of a target group of devices of the network, wherein within the application classification glossary for a particular device, each application belonging to a respective classification sub-set is grouped together with all applications that both belong to that same classification sub-set and are hosted on the particular device;
   determine a first move group of applications by identifying as the first move group all applications sharing a common membership in a first classification sub-set of the one or more classification sub-sets;
   determine a second move group of applications by identifying as the second move group one or more applications from a plurality of applications sharing a common membership in a second classification sub-set of the one or more classification sub-sets based at least partly on the one or more applications sharing a common location property separate from common membership in the second classification sub-set;
   cause display of a user interface representing at least one of the first move group of applications or the second move group of applications; and receive, via the user interface, filter data representing a filter to be used to denominate a third move group of applications.

12. The non-transitory computer-readable storage of claim 11, wherein the executable instructions further configure the computing system to obtain network interface table data representing interface names, hardware identifiers, and media types associated with network traffic, wherein the network traffic flow is determined based at least partly on the network interface table data.

13. The non-transitory computer-readable storage of claim 11, wherein the executable instructions further configure the computing system to receive, via the user interface, customization data representing a customization to be applied to at least one of the first move group of applications or the second move group of applications.

14. The non-transitory computer-readable storage of claim 11, wherein each application in the first classification sub-set is classified in the first classification sub-set based at least partly on a common characteristic of applications in the first classification sub-set, wherein the common characteristic relates to one of: an operating system, an application function, or an application security profile.

* * * * *

UNITED STATES PATENT AND TRADEMARK OFFICE
CERTIFICATE OF CORRECTION

PATENT NO. : 10,673,934 B2
APPLICATION NO. : 16/167135
DATED : June 2, 2020
INVENTOR(S) : Jeremy Lynn Littlejohn et al.

It is certified that error appears in the above-identified patent and that said Letters Patent is hereby corrected as shown below:

In the Specification

In Column 2, Line 13, delete "et)." and insert --etc).--.

In Column 2, Line 45, delete "(internet" and insert --(Internet--.

In Column 4, Line 4, delete "par" and insert --pair--.

In Column 4, Line 13, delete "processor" and insert --processor,--.

In Column 5, Line 25, delete "antivirus" and insert --anti-virus--.

In Column 5, Line 37, delete "message (i.e.," and insert --(i.e.,--.

In Column 5, Line 60, delete "a" and insert --all--.

In Column 7, Line 10, delete "app cations" and insert --applications--.

In Column 7, Line 13, delete "can" and insert --can be--.

In Column 7, Line 36, delete "interfaces." and insert --Interfaces.--.

In the Claims

In Column 9, Line 17, Claim 4, delete "subset" and insert --sub-set--.

Signed and Sealed this
Twenty-fifth Day of August, 2020

Andrei Iancu
*Director of the United States Patent and Trademark Office*